(12) United States Patent
Shettigara

(10) Patent No.: US 12,442,927 B2
(45) Date of Patent: Oct. 14, 2025

(54) LiDAR SYSTEM HAVING A SHARED CLOCK SOURCE, AND METHODS OF CONTROLLING SIGNAL PROCESSING COMPONENTS USING THE SAME

(71) Applicant: VELODYNE LIDAR USA, INC., San Jose, CA (US)

(72) Inventor: Rajanatha Shettigara, San Jose, CA (US)

(73) Assignee: Velodyne Lidar USA, Inc., San Jose, CA (US)

( * ) Notice: Subject to any disclaimer, the term of this patent is extended or adjusted under 35 U.S.C. 154(b) by 966 days.

(21) Appl. No.: 17/559,765

(22) Filed: Dec. 22, 2021

(65) Prior Publication Data

US 2023/0204780 A1 Jun. 29, 2023

(51) Int. Cl.
*G01S 17/894* (2020.01)
*G01S 7/4865* (2020.01)
*G01S 17/34* (2020.01)

(52) U.S. Cl.
CPC .......... *G01S 17/894* (2020.01); *G01S 7/4865* (2013.01); *G01S 17/34* (2020.01)

(58) Field of Classification Search
CPC ...... G01S 17/894; G01S 7/4865; G01S 17/34; G01S 7/4914; G01S 7/497; G01S 7/003; G01S 7/4863; G01S 17/42
See application file for complete search history.

(56) References Cited

U.S. PATENT DOCUMENTS 8,559,969 B2 * 10/2013 Hammes ............... G01S 19/235
342/357.62
8,818,282 B2 * 8/2014 Kim ...................... H04B 1/403
455/76

\* cited by examiner

*Primary Examiner* — Seung C Sohn
(74) *Attorney, Agent, or Firm* — Kilpatrick Townsend & Stockton LLP

(57) ABSTRACT

A light detection and ranging (LIDAR) system may include a transceiver disposed on a first substrate and comprising a plurality of receiver detectors; and a shared clock source disposed remotely from the transceiver on a second substrate and comprising a shared clock that is structured and arranged to control and synchronize operation of the plurality of receiver detectors to determine time-of-flight or reflectance.

14 Claims, 11 Drawing Sheets

LiDAR SYSTEM HAVING A SHARED CLOCK SOURCE, AND METHODS OF CONTROLLING SIGNAL PROCESSING COMPONENTS USING THE SAME

FIELD OF TECHNOLOGY

The present disclosure relates generally to light detection and ranging ("LiDAR") technology and, more specifically, to LiDAR systems having a shared clock source.

BACKGROUND

Light detection and ranging ("LiDAR") systems measure the attributes of their surrounding environments (e.g., shape of a target, contour of a target, distance to a target, etc.) by illuminating the target with light (e.g., laser light) and measuring the reflected light with sensors. Differences in laser return times and wavelengths can then be used to make digital, three-dimensional ("3D") representations of a surrounding environment. LiDAR technology may be used in various applications including autonomous vehicles, advanced driver assistance systems, mapping, security, surveying, robotics, geology and soil science, agriculture, unmanned aerial vehicles, airborne obstacle detection (e.g., obstacle detection systems for aircraft), etc. Depending on the application and associated field of view ("FOV"), multiple channels or laser beams may be used to produce images in a desired resolution. A LiDAR system with greater numbers of channels can generally generate larger numbers of pixels.

In a multi-channel LiDAR device, optical transmitters are paired with optical receivers to form multiple "channels." In operation, each channel's transmitter emits an optical signal (e.g., laser beam) into the device's environment, and each channel's receiver detects the portion of the return signal that is reflected back to the receiver by the surrounding environment. In this way, each channel provides "point" measurements of the environment, which can be aggregated with the point measurements provided by the other channel(s) to form a "point cloud" of measurements of the environment.

The measurements collected by a LiDAR channel may be used to determine the distance ("range") from the device to the surface in the environment that reflected the channel's transmitted optical signal back to the channel's receiver. In some cases, the range to a surface may be determined based on the time-of-flight ("TOF") of the channel's signal (e.g., the time elapsed from the transmitter's emission of the optical signal to the receiver's reception of the return signal reflected by the surface). In other cases, the range may be determined based on the wavelength (or frequency) of the return signal(s) reflected by the surface.

In some instances, LiDAR measurements may be used to determine the reflectance of the surface that reflects an optical signal. The reflectance of a surface may be determined based on the intensity on the return signal, which generally depends not only on the reflectance of the surface but also on the range to the surface, the emitted signal's glancing angle with respect to the surface, the power level of the channel's transmitter, the alignment of the channel's transmitter and receiver, and other factors.

Although some LiDAR systems traditionally include tunable lasers, internal radio frequency (RF) amplifiers, and separate analog receiver and modulator components, in many applications, external (e.g., closed-loop) control hardware has been used to maintain phase stabilization among these components. To address this shortcoming, some conventional LiDAR detector circuits have been configured to transmit and receive optical signals and to process electrical signals corresponding to the optical signals using, for example, an integrated transmit and receive optical subassembly ("TROSA").

A TROSA may be adapted to use reference signals (e.g., from a clock source) to process analog electrical signals corresponding to optical signals. These reference signals may be used by electrical signal processing components of the TROSA to digitize analog electrical signals corresponding to transmitted and/or received optical signals (e.g., analog signals generated by photodetectors and digitized by one or more analog-to-digital converters ("ADCs") and/or time-to-digital converters ("TDCs"), etc.). The digitized signals may then be digitally processed by a processor, e.g., a field programmable gate array (FPGA), a central processing unit (CPU), a graphics processing unit (GPU), application specific integrated circuit (ASIC), or the like. For example, in some implementations, the TROSA may include one or more ADCs, each having a phase-locked loop ("PLL") circuit that is adapted to generate the sampling clock for a discrete ADC.

The foregoing examples of the related art and limitations therewith are intended to be illustrative and not exclusive, and are not admitted to be "prior art." Other limitations of the related art will become apparent to those of skill in the art upon a reading of the specification and a study of the drawings.

SUMMARY

According to a first aspect of the present disclosure, a light detection and ranging (LIDAR) system may include a transceiver disposed on a first substrate and comprising a plurality of receiver detectors, and a shared clock source disposed remotely from the transceiver on a second substrate and comprising a shared clock that is structured and arranged to control and synchronize operation of the plurality of receiver detectors to determine time-of-flight or reflectance.

According to another aspect of the present disclosure, a method of operating a light detection and ranging (LIDAR) system to control and synchronize operation of a transceiver comprising a plurality of receiver detectors disposed on a first substrate and a shared clock source is provided. The method may include generating, using the shared clock source disposed remotely from the first substrate on the second substrate, a reference clock signal; and transmitting the reference clock signal to at least one receiver detector included in the plurality of receiver detectors.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the general description given above and the detailed description of the preferred embodiments given below serve to explain and teach the principles described herein.

Figure 1A:
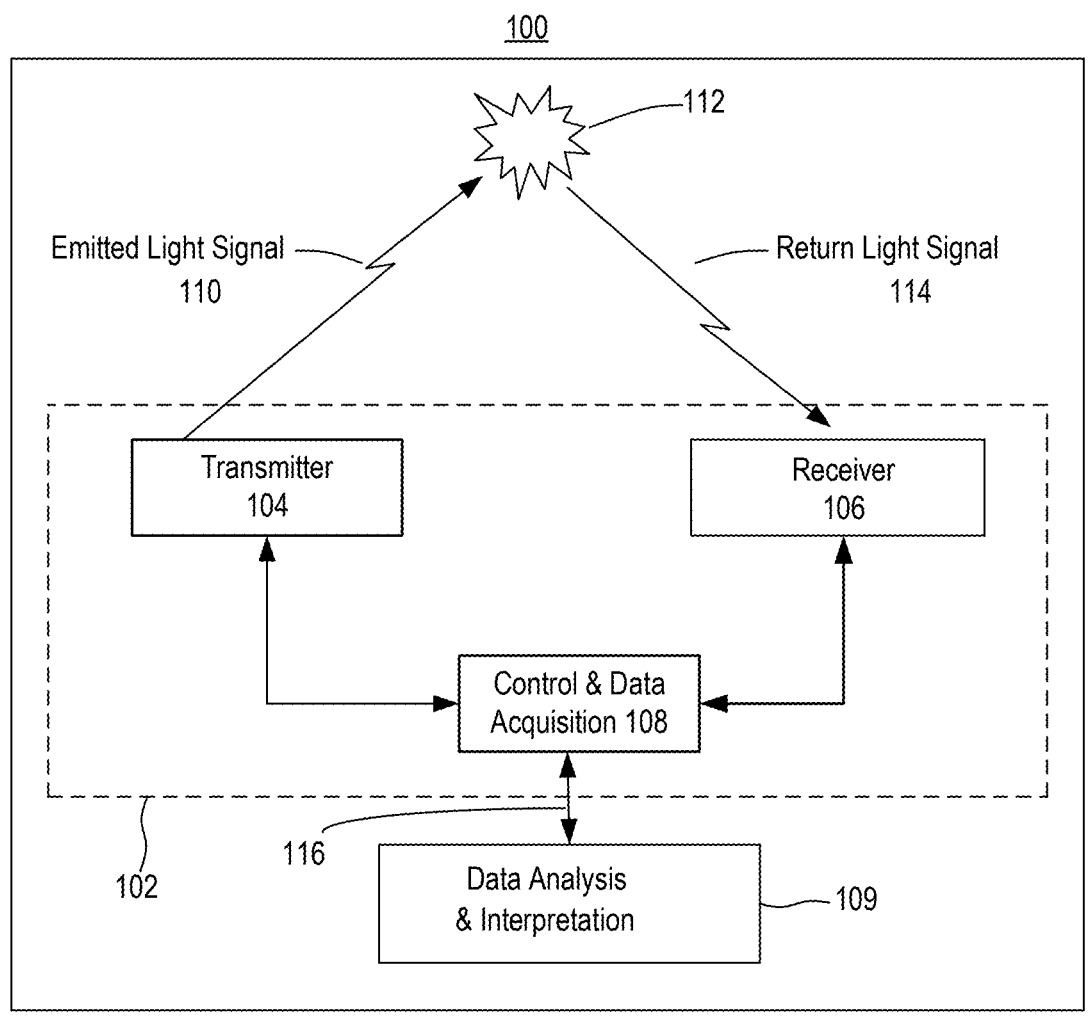
FIG. 1A shows an illustration of an exemplary LiDAR system, in accordance with some embodiments.

While the present disclosure is subject to various modifications and alternative forms, specific embodiments thereof have been shown by way of example in the drawings and will herein be described in detail. The present disclosure should not be understood to be limited to the particular forms disclosed, but on the contrary, the intention is to cover all modifications, equivalents, and alternatives falling within the spirit and scope of the present disclosure.

DETAILED DESCRIPTION

Systems and methods for LiDAR-based detection using a shared clock source (e.g., a single sampling clock source) are disclosed. It will be appreciated that, for simplicity and clarity of illustration, where considered appropriate, reference numerals may be repeated among the figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details.

Motivation for and Benefits of Some Embodiments

A TROSA may include one or more electrical signal processing components (e.g., ADCs, TDCs, ASICs, etc.), some (or each) of which may have a phase-locked loop ("PLL") circuit that is adapted to generate the clock signal for the discrete signal processing component (e.g., the sampling clock signal for a discrete ADC). PLL circuits are generally structured and arranged to compare an adjustable feedback signal to a reference signal. The PLL is deemed "locked" when the phase and frequency of the PLL's output signal match the phase and frequency of the reference signal. Because different PLLs are effectively used as clock signals for different signal processing components, clock mismatch and/or clock drift may become problematic. In some TROSA implementations, a dedicated clock source is provided for each signal processing component, such that a single clock source is not used to control multiple signal processing components. Providing redundant clock signals to discrete signal processing components is expensive and the redundant clock-generating circuits (e.g., PLLs) also take up valuable space on the printed circuit boards ("PCBs") on which they are disposed. Performance of the system is also affected because the various clock sources are generally not synchronized.

In some TROSA implementations, the failure to integrate signal processing components with the PLLs that provide their clock signals creates additional problems. For example, in some TROSA implementations, signal processing components and their PLLs are discrete components disposed on separate PCBs. Disadvantageously, when a signal processing component is disposed on a rotating portion of a LIDAR sensor (e.g., a rotor) and the PLL and/or the clock source is disposed on a fixed or stationary portion of the LIDAR sensor (e.g., a stator), the clock signal is transmitted across the rotational boundary between the rotor and the stator, potentially introducing significant noise into the clock signal. As a result, historically, separate clock sources have been provided for the rotor and the stator.

Accordingly, it would be desirable to integrate multiple signal processing components of a TROSA on a single PCB (e.g., a PCB disposed on a rotating portion of a LIDAR sensor) and, furthermore, to use a single clock source for multiple (e.g., all) signal processing components of the TROSA. Optionally, the clock signal may also be provided to one or more communication ports (e.g., Ethernet ports, etc.) of the LIDAR sensor. In addition, it would be desirable to provide a circuit that reliably propagates a reference clock signal across a rotational boundary.

Problematically, some LiDAR systems employ multiple reference clock sources that are adapted to transmit reference signals to respective receivers (or even to different signal processing components within the same receiver). Such systems tend to create or generate more heat, greater expense, greater electrical power needs, clock mismatch, and/or clock drift (e.g., due to insufficient synchronization between the various reference clock sources), and also tend to use additional space on printed circuit boards ("PCBs"). These shortcomings may be further exacerbated on rotational systems as, conventionally, sampling clock sources and receivers have been placed on separate elements (e.g., the fixed or stationary element and the rotating element, respectively) of the LIDAR system. Integrating a shared clock source into a LIDAR sensor may provide greater synchronization of reference signals to a multiplicity of receivers and their signal processing components, thereby addressing the above-discussed problems.

Although the detailed description will describe multi-channel receiver implementations or components that include, for example, analog-to-digital converters ("ADCs") in combination with a single reference signal/clock, this is done for the purpose of illustration rather than limitation. Components of a receiver (e.g., multi-channel receiver) that share a reference signal/clock may include (e.g., off-the-shelf) ADCs, ASICs, time-to-digital converters ("TDCs"), processors, other signal processing components, and the like.

Some Examples of LiDAR Systems

A light detection and ranging ("LiDAR") system may be used to measure the shape and contour of the environment surrounding the system. LiDAR systems may be applied to numerous applications including autonomous navigation and aerial mapping of surfaces. In general, a LiDAR system emits light that is subsequently reflected by objects within the environment in which the system operates. In some examples, the LiDAR system is configured to emit light pulses. The time each pulse travels from being emitted to being received (i.e., time-of-flight, "TOF" or "ToF") may be measured to determine the distance between the LiDAR system and the object that reflects the pulse. In other examples, the LiDAR system can be configured to emit continuous wave (CW) light. The wavelength (or frequency) of the received, reflected light may be measured to determine the distance between the LiDAR system and the object that reflects the light. In some examples, LiDAR systems can measure the speed (or velocity) of objects. The science of LiDAR systems is based on the physics of light and optics.

In a LiDAR system, light may be emitted from a rapidly firing laser. Laser light travels through a medium and reflects off points of surfaces in the environment (e.g., surfaces of buildings, tree branches, vehicles, etc.). The reflected light energy returns to a LiDAR detector where it may be recorded and used to map the environment.

FIG. 1A depicts the operation of a LiDAR system 100, according to some embodiments. In the example of FIG. 1A, the LiDAR system 100 includes a LiDAR device 102, which may include a transmitter 104 that generates and emits a light signal 110, a receiver 106 that detects a return light signal 114, and a control & data acquisition module 108. The transmitter 104 may include a light source (e.g., laser), electrical components operable to activate ("drive") and deactivate the light source in response to electrical control signals, and optical components adapted to shape and redirect the light emitted by the light source. The receiver 106 may include an optical detector (e.g., photodiode) and optical components adapted to shape return light signals 114 and direct those signals to the detector. In some implementations, one or more of optical components (e.g., lenses, mirrors, etc.) may be shared by the transmitter and the receiver. The LiDAR device 102 may be referred to as a LiDAR transceiver or "channel." In operation, the emitted (e.g., illumination) light signal 110 propagates through a medium and reflects off an object(s) 112, whereby a return light signal 114 propagates through the medium and is received by receiver 106.

The control & data acquisition module 108 may control the light emission by the transmitter 104 and may record data derived from the return light signal 114 detected by the receiver 106. In some embodiments, the control & data acquisition module 108 controls the power level at which the transmitter 104 operates when emitting light. For example, the transmitter 104 may be configured to operate at a plurality of different power levels, and the control & data acquisition module 108 may select the power level at which the transmitter 104 operates at any given time. Any suitable technique may be used to control the power level at which the transmitter 104 operates. In some embodiments, the control & data acquisition module 108 determines (e.g., measures) particular characteristics of the return light signal 114 detected by the receiver 106. For example, the control & data acquisition module 108 may measure the intensity of the return light signal 114 using any suitable technique.

A LiDAR transceiver 102 may include one or more optical lenses and/or mirrors (not shown) to redirect and shape the emitted light signal 110 and/or to redirect and shape the return light signal 114. The transmitter 104 may emit a laser beam (e.g., a beam having a plurality of pulses in a particular sequence). Design elements of the receiver 106 may include its horizontal field of view (hereinafter, "FOV") and its vertical FOV. One skilled in the art will recognize that the FOV parameters effectively define the visibility region relating to the specific LiDAR transceiver 102. More generally, the horizontal and vertical FOVs of a LiDAR system 100 may be defined by a single LiDAR device (e.g., sensor) or may relate to a plurality of configurable sensors (which may be exclusively LiDAR sensors or may have different types of sensors). The FOV may be considered a scanning area for a LiDAR system 100. A scanning mirror and/or rotating assembly may be utilized to obtain a scanned FOV.

In some implementations, the LiDAR system 100 may include or be electronically coupled to a data analysis & interpretation module 109, which may receive outputs (e.g., via connection 116) from the control & data acquisition module 108 and perform data analysis functions on those outputs. The connection 116 may be implemented using a wireless or non-contact communication technique.

Figure 1B:
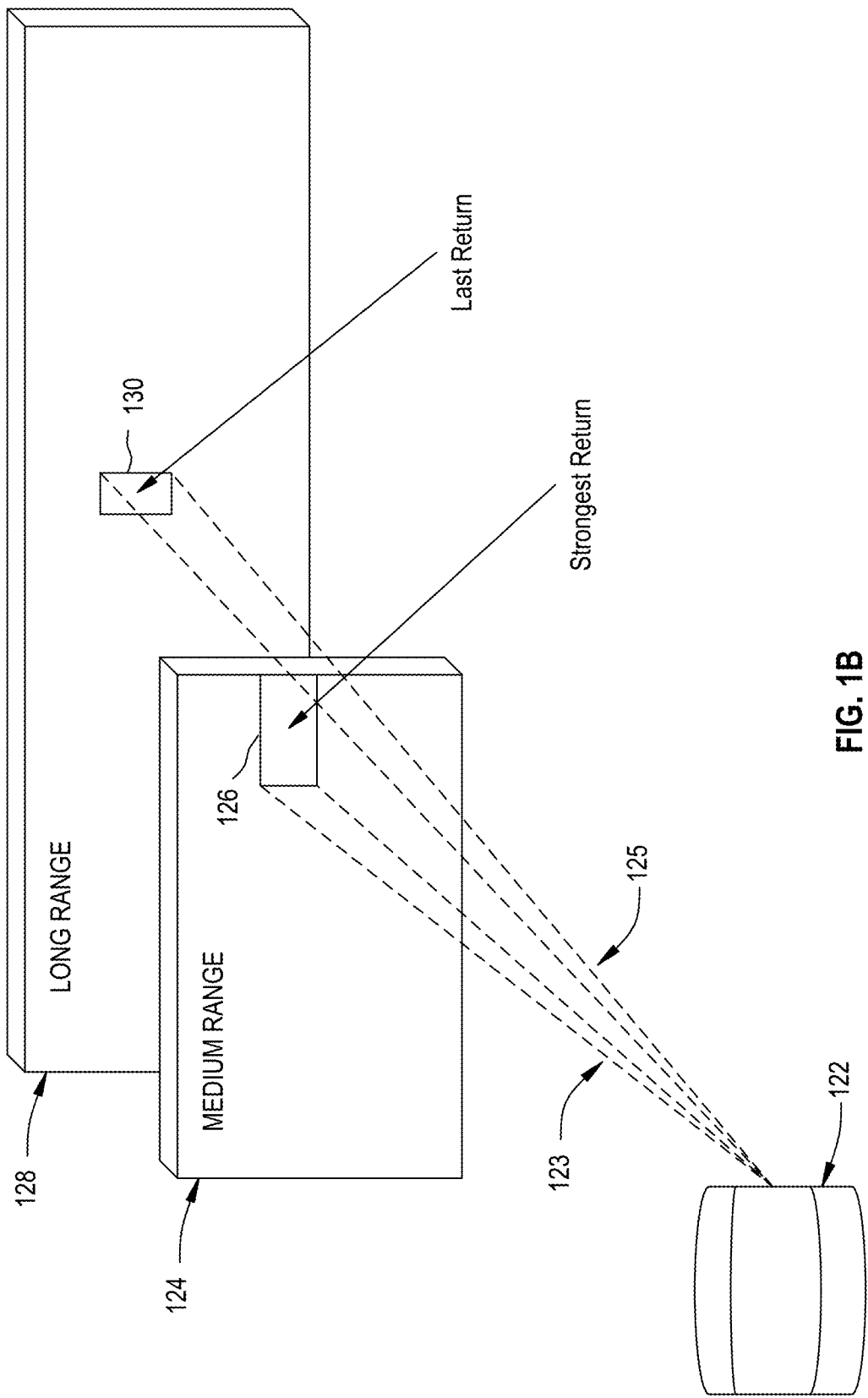
FIG. 1B is an illustration of the operation of an example of a LiDAR system.

FIG. 1B illustrates the operation of a LiDAR system 122, in accordance with some embodiments. In the example of FIG. 1B, two return light signals 123 and 125 are shown. Laser beams generally tend to diverge as they travel through a medium. Due to the laser's beam divergence, a single laser emission may hit multiple objects at different ranges from the LiDAR system 122, producing multiple return signals 123, 125. The LiDAR system 122 may analyze multiple return signals 123, 125 and report one of the return signals (e.g., the strongest return signal, the last return signal, etc.) or more than one (e.g., all) of the return signals. In the example of FIG. 1B, LiDAR system 122 emits laser light in the direction of near wall 124 and far wall 128. As illustrated, the majority of the emitted light hits the near wall 124 at area 126 resulting in a return signal 123, and another portion of the emitted light hits the far wall 128 at area 130 resulting in a return signal 125. Return signal 123 may have a shorter TOF and a stronger received signal strength compared with return signal 125. In both single- and multiple-return LiDAR systems, it is important that each return signal is accurately associated with the transmitted light signal so that one or more attributes of the object that reflect the light signal (e.g., range, velocity, reflectance, etc.) can be correctly calculated.

Some embodiments of a LiDAR system may capture distance data in a two-dimensional (2D) (e.g., single plane) point cloud manner. These LiDAR systems may be used in industrial applications, or for surveying, mapping, autonomous navigation, and other uses. Some embodiments of these systems rely on the use of a single laser emitter/detector pair combined with a moving mirror to effect scanning across at least one plane. This mirror may reflect the emitted light from the transmitter (e.g., laser diode), and/or may reflect the return light to the receiver (e.g., to the detector). Use of a movable (e.g., oscillating) mirror in this manner may enable the LiDAR system to achieve 90-180-360 degrees of azimuth (horizontal) view while simplifying both the system design and manufacturability. Many applications require more data than just a 2D plane. The 2D point cloud may be expanded to form a three-dimensional ("3D") point cloud, in which multiple 2D point clouds are used, each pointing at a different elevation (e.g., vertical) angle. Design elements of the receiver of the LiDAR system 122 may include the horizontal FOV and the vertical FOV.

Figure 1C:
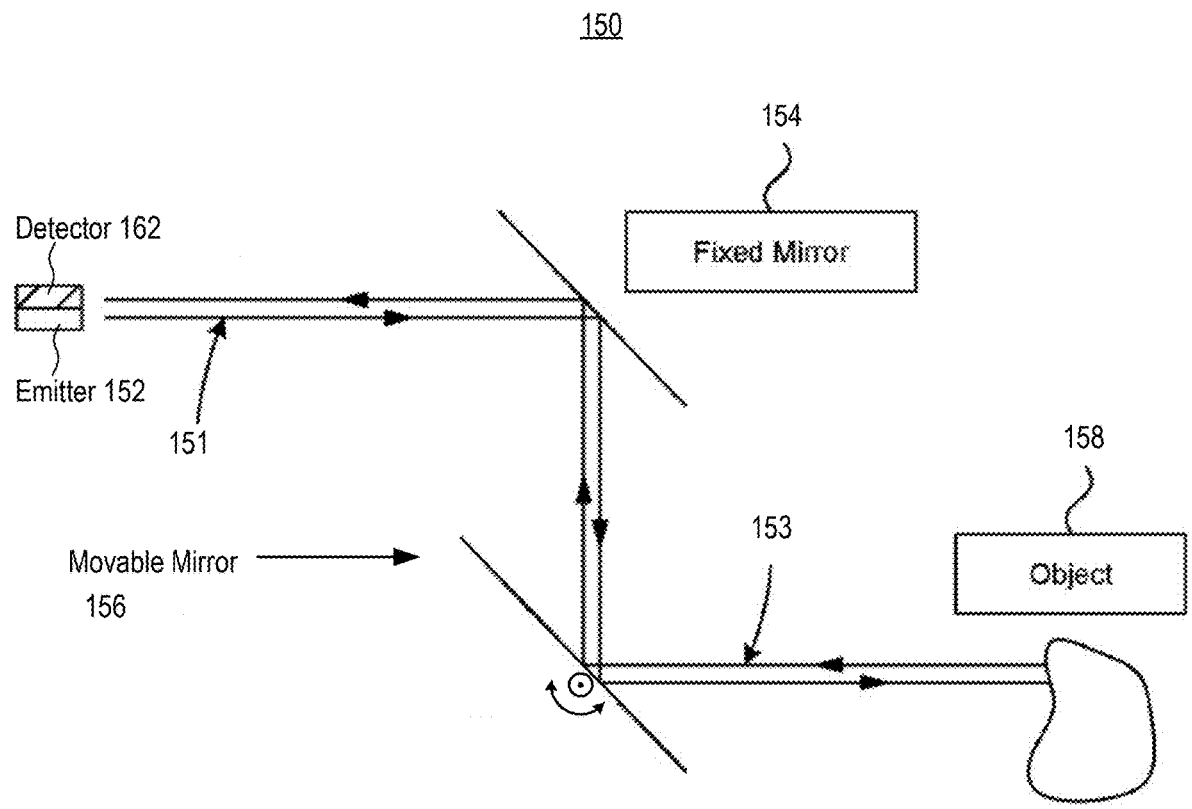
FIG. 1C is an illustration of an example of a directional LiDAR system with a movable mirror.

FIG. 1C depicts a LiDAR system 150 with a movable (e.g., oscillating) mirror, according to some embodiments. In the example of FIG. 1C, the LiDAR system 150 uses a single emitter 152/detector 162 pair combined with a fixed mirror 154 and a movable mirror 156 to effectively scan across a plane. Distance measurements obtained by such a system may be effectively two-dimensional (e.g., planar), and the captured distance points may be rendered as a 2D (e.g., single plane) point cloud. In some embodiments, but without limitation, the movable mirror 156 may oscillate at very fast speeds (e.g., thousands of cycles per minute).

The emitted laser signal 151 may be directed to a fixed mirror 154, which may reflect the emitted laser signal 151 to the movable mirror 156. As movable mirror 156 moves (e.g., oscillates), the emitted laser signal 151 may reflect off an object 158 in its propagation path. The reflected return signal 153 may be coupled to the detector 162 via the movable mirror 156 and the fixed mirror 154. Design elements of the LiDAR system 150 include the horizontal FOV and the vertical FOV, which define a scanning area.

Figure 1D:
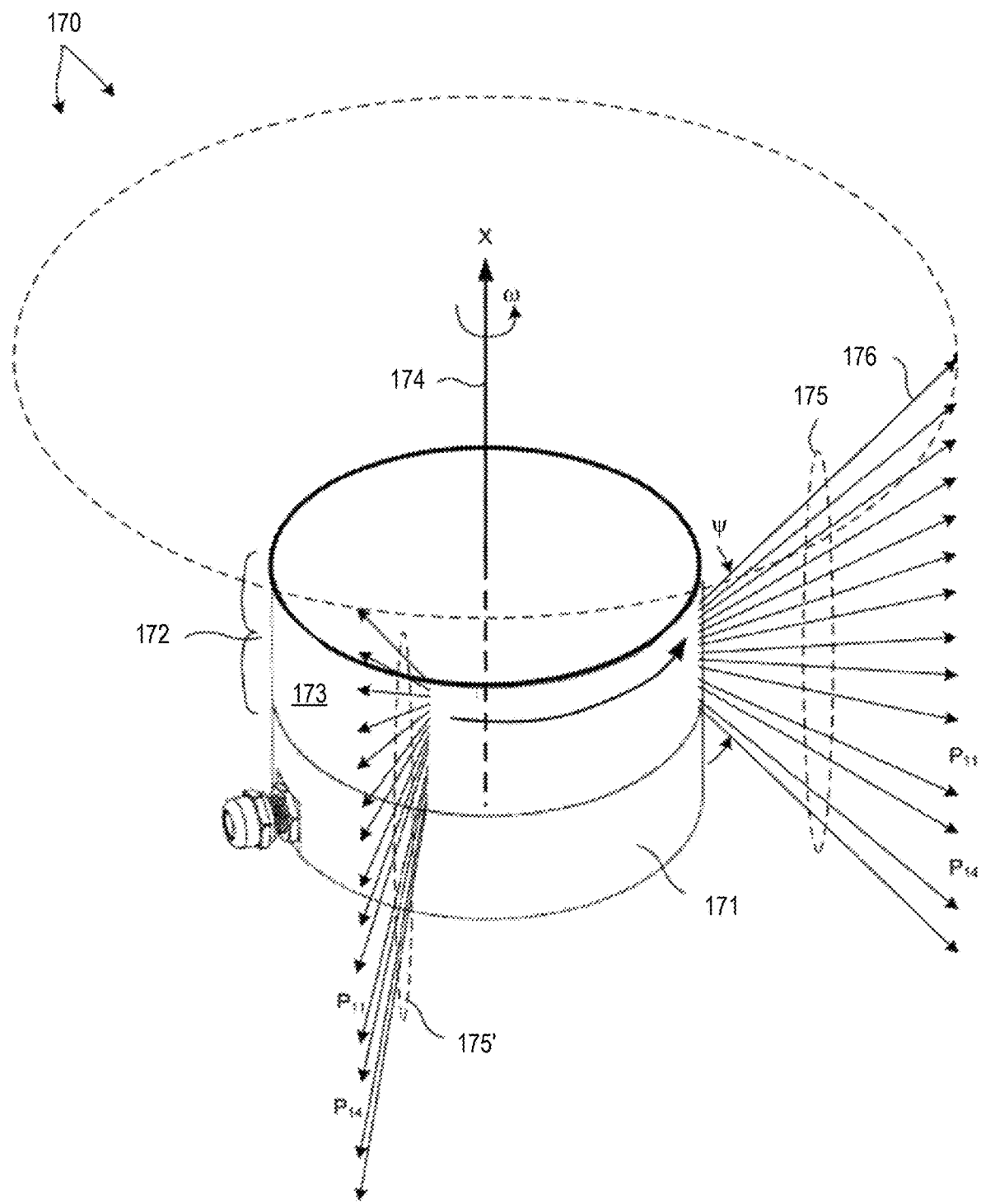
FIG. 1D is an illustration of an example of a three-dimensional ("3D") LiDAR system.

FIG. 1D depicts a 3D LiDAR system 170, according to some embodiments. In the example of FIG. 1D, the 3D LiDAR system 170 includes a lower housing 171 and an upper housing 172. The upper housing 172 includes a cylindrical shell element 173 constructed from a material that is transparent to infrared light (e.g., light having a wavelength within the spectral range of 700 to 1,700 nanometers). In one example, the cylindrical shell element 173 is transparent to light having wavelengths centered at 905 nanometers.

In some embodiments, the 3D LiDAR system 170 includes a LiDAR transceiver 102 operable to emit laser beams 176 through the cylindrical shell element 173 of the upper housing 172. In the example of FIG. 1D, each individual arrow in the sets of arrows 175, 175' directed outward from the 3D LiDAR system 170 represents a laser beam 176 emitted by the 3D LiDAR system. Each beam of light emitted from the system 170 may diverge slightly, such that each beam of emitted light forms a cone of illumination light emitted from system 170. In one example, a beam of light emitted from the system 170 illuminates a spot size of 20 centimeters in diameter at a distance of 100 meters from the system 170.

In some embodiments, the transceiver 102 emits each laser beam 176 transmitted by the 3D LiDAR system 170. The direction of each emitted beam may be determined by the angular orientation ω of the transceiver's transmitter 104 with respect to the system's central axis 174 and by the angular orientation ω of the transmitter's movable mirror 256 with respect to the mirror's axis of oscillation (or rotation). For example, the direction of an emitted beam in a horizontal dimension may be determined by the transmitter's angular orientation ω, and the direction of the emitted beam in a vertical dimension may be determined by the angular orientation ψ of the transmitter's movable mirror. Alternatively, the direction of an emitted beam in a vertical dimension may be determined the transmitter's angular orientation ω, and the direction of the emitted beam in a horizontal dimension may be determined by the angular orientation ψ of the transmitter's movable mirror. (For purposes of illustration, the beams of light 175 are illustrated in one angular orientation relative to a non-rotating coordinate frame of the 3D LiDAR system 170 and the beams of light 175' are illustrated in another angular orientation relative to the non-rotating coordinate frame.)

The 3D LiDAR system 170 may scan a particular point (e.g., pixel) in its field of view by adjusting the orientation ω of the transmitter and the orientation ψ of the transmitter's movable mirror to the desired scan point (ω, ψ) and emitting a laser beam from the transmitter 104. Likewise, the 3D LiDAR system 170 may systematically scan its field of view by adjusting the orientation ω of the transmitter and the orientation ψ of the transmitter's movable mirror to a set of scan points ($\omega_i$, $\psi_j$) and emitting a laser beam from the transmitter 104 at each of the scan points.

Assuming that the optical component(s) (e.g., movable mirror 256) of a LiDAR transceiver remain stationary during the time period after the transmitter 104 emits a laser beam 110 (e.g., a pulsed laser beam or "pulse" or a CW laser beam) and before the receiver 106 receives the corresponding return beam 114, the return beam generally forms a spot centered at (or near) a stationary location LO on the detector. This time period is referred to herein as the "ranging period" of the scan point associated with the transmitted beam 110 and the return beam 114.

In many LiDAR systems, the optical component(s) of a LiDAR transceiver do not remain stationary during the ranging period of a scan point. Rather, during a scan point's ranging period, the optical component(s) may be moved to orientation(s) associated with one or more other scan points, and the laser beams that scan those other scan points may be transmitted. In such systems, absent compensation, the location Li of the center of the spot at which the transceiver's detector receives a return beam 114 generally depends on the change in the orientation ωf the transceiver's optical component(s) during the ranging period, which depends on the angular scan rate (e.g., the rate of angular motion of the movable mirror 256) and the range to the object 112 that reflects the transmitted light. The distance between the location Li of the spot formed by the return beam and the nominal location LO of the spot that would have been formed absent the intervening rotation of the optical component(s) during the ranging period is referred to herein as "walk-off."

Shared Clock with LIDAR System having Rotational Sensors

Figure 2:
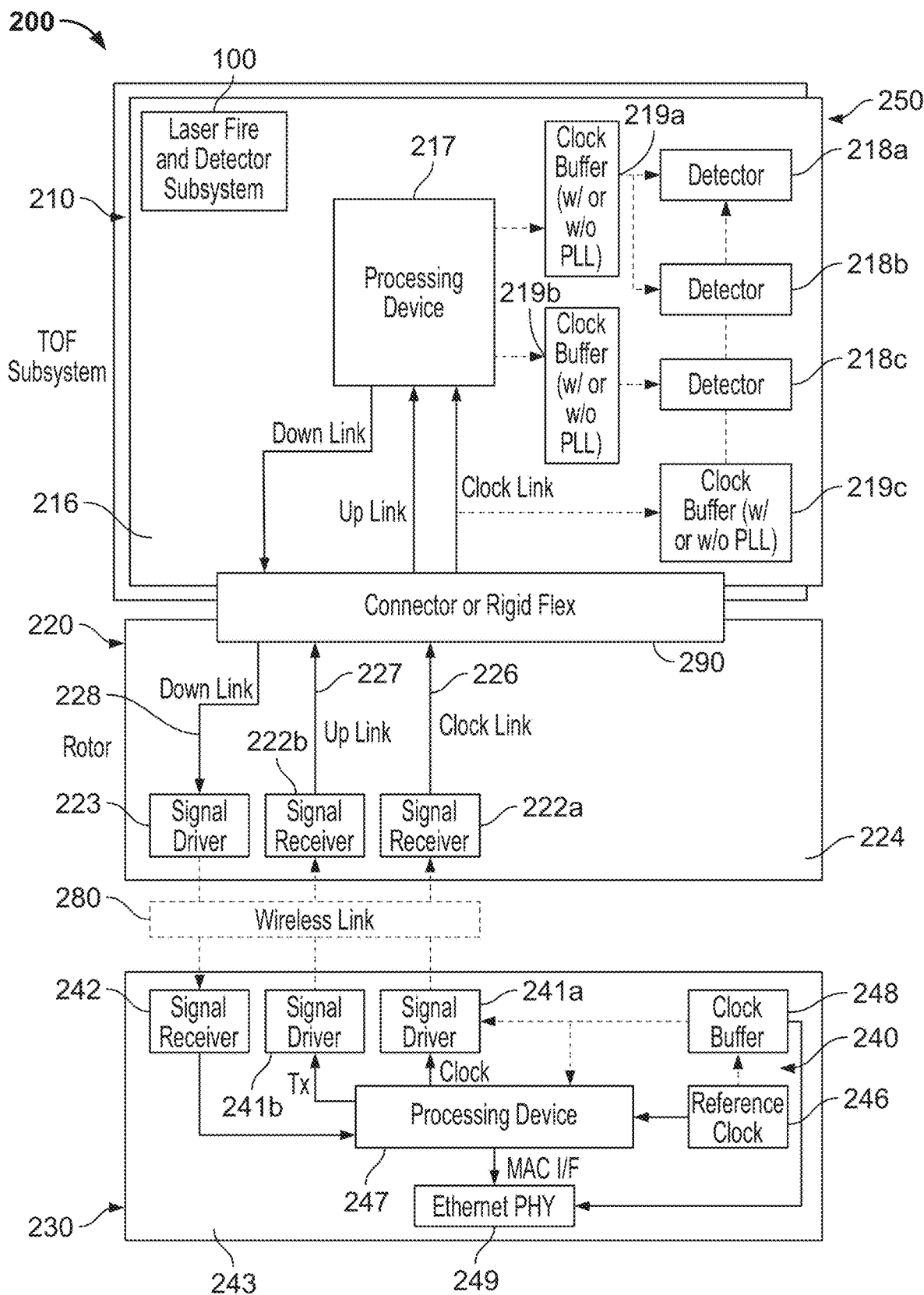
FIG. 2 shows an illustration of an exemplary LiDAR system having rotational sensors and a shared clock source, in accordance with some embodiments.

Referring to FIG. 2, a first embodiment of a novel LIDAR three-dimensional ("3D") system 200 that employs rotational sensors is shown. In some implementations, the LIDAR system 200 may include one or more subsystems 210 operatively disposed (e.g., using a connector, rigid flex, or the like (290) within a housing on a rotating element (e.g., a rotor portion 220) in combination with a single, integrated sampling clock source 240 that is operatively disposed (e.g., remotely from the rotor-mounted subsystem 210) on a stationary element (e.g., a stator portion 230).

In some applications, the rotor-mounted subsystem 210 may include one or more of the LIDAR subsystem(s) 100 as previously described. In some implementations, the rotor-mounted subsystem 210 may include a plurality of receiver detectors (218a, 218b, 218c), all of which may be disposed on a (e.g., common) PCB 216 shared by the LIDAR subsystem 100. As used herein, "receiver detector" may refer to a channel's optical detector and associated electrical signal processing components. In some implementations, each of the receiver detectors may include a dedicated or integrated ADC that is disposed on a (e.g., common) PCB 216 shared by the LIDAR subsystem 100. Although FIG. 2 only shows three receiver detectors (218a, 218b, 218c), this is done for the purpose of illustration rather than limitation. Those of ordinary skill in the art can appreciate that certain subsystems 210 may be configured to include more (or fewer) receiver detectors (218a, 218b, 218c). Although this disclosure describes multi-channel receiver implementations or components that include ADCs in combination with a shared reference signal/clock, this is done for the purpose of illustration rather than limitation. Shared reference signal/ clock implementations or components for multi-channel receivers may include any suitable (e.g., off-the-shelf) electrical signal processing components (e.g., ADCs, ASICs, time-to-digital converters ("TDCs"), and the like).

The receiver detectors (218a, 218b, 218c) may be further structured and arranged to be in electrical (e.g., digital) communication with a processor (hereinafter, "master controller 217") (e.g., a FPGA, a CPU, a GPU, or the like). The master controller 217 may also be disposed on the (e.g., common) PCB 216 and, further, adapted to generate a plurality of command signals to the subsystem's transmitter integrated circuits and/or receiver integrated circuits in the LIDAR subsystem 210. The triggering of these command signals may be based on a reference clock signal 226 generated by the shared clock (e.g., single sampling clock) 246 and transmitted indirectly to the receiver detectors (218a, 218b, 218c) via the master controller 217. In an illustrative implementation including ADCs, the reference clock signal 226 generated by the shared clock 246 may be used by the ADCs to control sampling, such that the reference clock signal 226 controls the receiver detectors' derivation of TOF and reflectance information from the return signal 114. More specifically, when the receiver detectors are implemented with ADCs, the ADCs may be adapted to convert signals to the digital domain, so that the receiver detectors calculate TOF and reflectance, which the master controller 217 aggregates, concatenates, and the like, forwarding the aggregations, concatenations, and the like to external devices.

Optionally, one or more clock buffers (219a, 219b, 219c) may be disposed on the (e.g., common) PCB 216, in electrical communication with the receiver detectors (218a, 218b, 218c). Although there are three clock buffers (219a, 219b, 219c) shown in FIG. 2, this is done for illustrative purposes only. Those of ordinary skill in the art can appreciate that implementations of the LiDAR system 200 may include more or fewer clock buffers. The clock buffers (219a, 219b, 219c) may be structured and arranged to provide a synchronized reference clock signal to the receiver detectors (218a, 218b, 218c) upon receiving the reference clock signal 226 (e.g., directly) from the shared clock source 246 located on the stator portion 230.

In some variations, each of the clock buffers (219a, 219b, 219c) may be configured to be in communication (e.g., electrical communication) with the shared clock source 246 located on the stator portion 230. For example, one or more clock buffers (219a, 219b) may be structured and arranged in electrical communication with the master controller 217 and corresponding receiver detectors (218a, 218b). According to this arrangement, the clock buffers (219a, 219b) may be adapted to provide reference signals (e.g., indirectly from the shared clock source 246) to the receiver detectors (218a, 218b, 218c) based on command signals received indirectly from the shared clock source 246 via the master controller 217.

Alternatively, or additionally, one or more clock buffer 219c may be structured and arranged in electrical communication with the receiver detectors (218a, 218b, 218c) that have been arranged in series (e.g., daisy-chained) and the shared clock source 246. Accordingly, the one or more clock buffer 219c may be adapted to provide (e.g., directly provide) reference signals to the receiver detectors (e.g., daisy-chained receiver detectors) based on a reference clock signal received (e.g., directly received) from the single sampling clock source 246. For increased performance, in some applications, however, each receiver detector may include its own PLL that is configured to receive (e.g., directly receive) the reference clock signal from the single sampling clock source 246 located on the stator portion 230.

As shown in FIG. 2, in some implementations, a plurality of signal receivers (222a, 222b) and a signal driver 223 may be integrated onto a PCB 224 that is disposed on the rotating element 220 (hereinafter the "rotor PCB 224"). Although FIG. 2 only shows two signal receivers (222a, 222b) and only a single signal driver 223, this is done for the purpose of illustration rather than limitation. Those of ordinary skill in the art can appreciate that more or fewer signal receivers and/or signal drivers may be used, as necessary.

In some variations, a first signal receiver 222a (e.g., a clock link receiver) may be operatively coupled to a first signal driver 241a (e.g., a clock link driver) integrated onto a (e.g., common) PCB 243 (hereinafter the "stator PCB 243") that is disposed on the fixed, or stationary, element 230 and a second signal receiver 222b (e.g., an uplink receiver) may be operatively coupled to a second signal driver 241b (e.g., an uplink driver) integrated onto the PCB 243. In operation, the first signal driver 241a may be configured to generate a clock link signal 226 to the first signal receiver 222a, while the second signal driver 241b may be configured to generate an uplink signal 227 to the second signal receiver 222b. A signal driver 223 (e.g., a downlink driver) disposed on the rotating element 220 may be configured to generate a downlink signal 228 to a signal receiver 242 (e.g., a downlink receiver) integrated into the stator PCB 243. Advantageously, the generated signals 226, 227, 228 may be transmitted across the rotational boundary 280 (e.g., wirelessly).

In some implementations, a reference clock 246 (hereinafter the "stator reference clock 246") and a processing device 247 (e.g., a FPGA, a CPU, a GPU, etc.) may also be disposed on the stator PCB 243. A clock buffer 248 coupled (e.g., electrically coupled) to the stator reference clock 246 may also be integrated onto the stator PCB 243. The stator reference clock 246 and clock buffer 248 combined form the reference clock source 240. Optionally, a communication port 249 (e.g., an Ethernet port) may also be disposed on the stator PCB 243. In some applications, the stator reference clock 246 is operatively coupled to the processing device 247. Advantageously, the stator reference clock 246 may be structured and arranged to drive (e.g., directly or indirectly) the receiver detectors (218a, 218b, 218c) that are disposed remotely on the rotating element 210 to synchronize the firing of the light illumination sources and the receipt of return light pulses, providing thereby a greater degree of synchronization than has been provided using multiple sampling clocks.

As shown illustratively in FIG. 2, the single stator reference clock 246 disposed on the stationary element 230 may drive and control the receiver detectors (218a, 218b, 218c) disposed remotely on the rotating element 220 in a number of ways. The stator reference clock 246 may also be used as a reference clock across other subsystems, such as the processor 247, and/or with an external communication port 249 (e.g., an automotive Ethernet port). Since the stator reference clock 246 may be used in connection with an external communication port 249 (e.g., an automotive Ethernet port), the frequency of the stator reference clock 246 may be in multiples of 25 MHz.

In a first implementation, the stator reference clock 246 may be used to drive and control the receiver detectors (218a, 218b, 218c) either indirectly (e.g., through the processor 247) or directly (e.g., through a clock buffer 248 (e.g., a 1 to N multiplexer)). Once the clock reference signal 226 is generated and transmitted to the clock link signal driver 241a, the clock link signal driver 241a may propagate the clock reference signal 226 to the clock link signal receiver 222a disposed on the rotating element 220, which, in turn, can transmit the clock reference signal 226 to the receiver detectors (218a, 218b, 218c).

To reliably calculate TOF, it is often desirable, in the various implementations, to ensure that the clock link system is "clean" or free of jitter. Optionally, to control and/or reduce (e.g., minimize) jitter, a phase-locked loop (PLL) circuit may be added to the LiDAR system 200. Advantageously, the PLL circuit may be added to (e.g., incorporated into) the master controller 217, the sampling clock 246, the receiver detector, etc.

In one variation, the clock link signal receiver 222a may transmit the clock reference signal 226 to drive the PLL circuits (with or without the use of clock buffers 219c) of the individual receiver detectors (218a, 218b, 218c) that are arranged in series (e.g., daisy-chained), such that the first receiver detector 218c receives the clock reference signal 226 and provides the clock reference signal 226 as input to a second receiver detector 218b, which provides the clock reference signal 226 as input to a third receiver detector 218a, and so forth. Advantageously, the receiver detectors (218a, 218b, 218c) and corresponding detector clocks may be daisy-chained to ease the clock routing. Thus, the clock reference signal 226 can synchronize the timing signals (e.g., sampling signals) for all receiver detectors (218a, 218b, 218c).

In a second variation, if the receiver detectors do not have input or output ports that would enable the above-described daisy-chaining, the receiver detector clocks and the associated electrical signal processing components (e.g., ADCs) may be driven by the master controller 217, which has associated PLL circuits (219a, 219b) that can be used to generate and provide clock reference signals to the various receiver detectors. Thus, after propagating the clock reference signal 226 to the clock link signal receiver 222a disposed on the rotating element 220, the clock reference signal 226 may be transmitted to the master controller 217. Subsequently, PLL circuits (219a, 219b) associated with the master controller 217 may generate clock reference signals to the various receiver detectors (e.g., to their corresponding ADCs).

Shared Clock with LIDAR System having Directional Sensors

Figure 3:
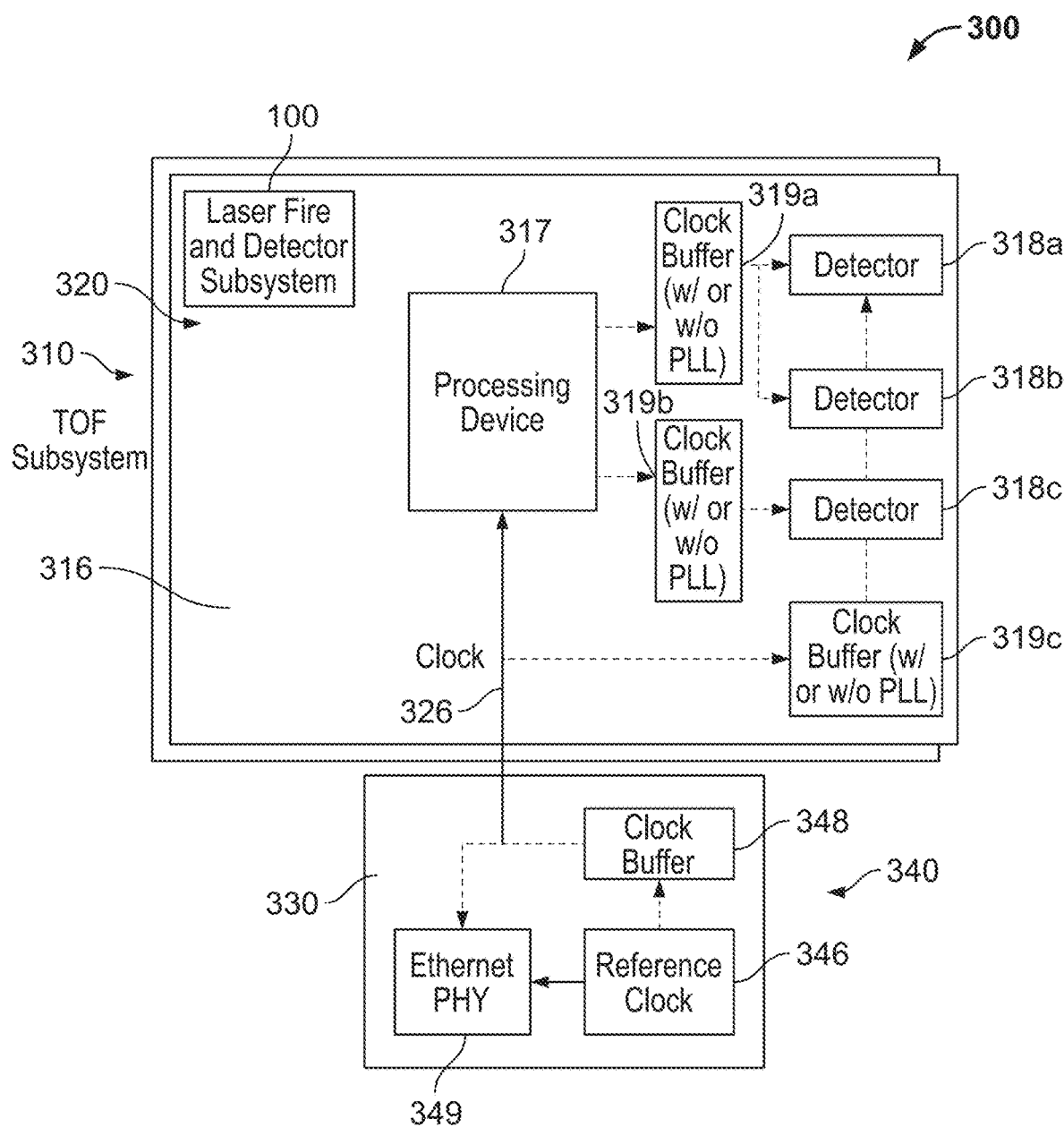
FIG. 3 shows an illustration of an exemplary LiDAR system having directional sensors and a shared clock source, in accordance with some embodiments.

Referring to FIG. 3, a second embodiment of a novel LIDAR 3D system that employs directional sensors, rather than rotating sensors, is shown. In some implementations, the LIDAR system 300 may include one or more LIDAR subsystems 310 (such as the subsystem described hereinabove) operatively disposed within a housing on a first element 320 and an integrated shared clock source (e.g., sampling clock source) 340 that is operatively disposed (e.g., remotely from the first element 320) on a second element 330. In some variations, the integrated shared clock source 340 may include a shared clock (e.g., a single sampling clock) 346 in combination with a clock buffer 348.

In some applications, the LIDAR subsystem 310 may include a plurality of receiver detectors (318a-c), each of which may include, for example, a dedicated analog-to-digital converter (ADC) having an on-board PLL circuit for controlling and synchronizing the timing of data sampling of return light signals. As previously mentioned, implementations or components for multi-channel receiver detectors may include (e.g., off-the-shelf) ADCs, ASICs, time-to-digital converters ("TDCs"), other electrical signal processing components, and the like. For the purpose of illustration rather than limitation, this disclosure generally refers to the sharing of a clock signal by a receiver's ADCs.

Although FIG. 3 shows only three receiver detectors (318a, 318b, 318c), this is done for the purpose of illustration rather than limitation. Those of ordinary skill in the art can appreciate that certain LIDAR subsystems 310 may be configured to include more (or fewer) receiver detectors 318a, 318b, 318c. Preferably, the components of the receiver detectors (318a, 318b, 318c) are disposed on a (e.g., common) PCB 316 shared by the LIDAR subsystem 100.

In some embodiments, the LIDAR subsystem 310 may also include a processor (hereinafter, "master controller 317") (e.g., a FPGA, a CPU, a GPU, etc.) that is disposed on the (e.g., common) PCB 316 and structured and arranged to be in electrical (e.g., digital) communication with the receiver detectors (318a, 318b, 318c). In some applications, the master controller 317 may be adapted to generate and provide a plurality of command signals to the LIDAR subsystem's 310 transmitter integrated circuits and/or receiver integrated circuits. The triggering of these command signals may be based on receipt of a reference clock signal 326 generated by the shared clock source 340 and transmitted indirectly to the receiver detectors (318a, 318b, 318c) via the master controller 317.

Optionally, the LIDAR subsystem 310 may also include one or more clock buffers (319a, 319b, 319c) that may also be disposed on the (e.g., common) PCB 316 (or, alternatively, integrated into the master controller 317). The one or more clock buffers (319a, 319b, 319c) may be structured and arranged to be in electrical (e.g., digital) communication with the receiver detectors (318a, 318b, 318c) and/or with the master controller 317. Although there are three clock buffers (319a, 319b, 319c) shown in FIG. 3, this is done for illustrative purposes only. Those of ordinary skill in the art will appreciate that LIDAR subsystem 310 may include more or fewer clock buffers, as necessary. The clock buffers (319a, 319b, 319c) may be adapted to provide synchronized reference clock signals to the receiver detectors upon receiving the reference clock signal (e.g., either directly or indirectly) from the shared clock source 340 located remotely.

In some variations, one or more clock buffers (319a, 319b) may be structured and arranged in electronical communication with the master controller 317 or alternatively may be integrated into the master controller 317. The clock buffers (319a, 319b) may be adapted to provide reference signals to the receiver detectors (318a, 318b, 318c) and/or their corresponding signal processing components based on command signals received from the master controller 317 (e.g., indirectly from the shared clock source 340). Alternatively, or additionally, one or more clock buffer 319c may be structured and arranged in electrical communication with the shared clock source 340 and, accordingly, may be adapted to provide reference signals to the daisy-chained receiver detectors (318a-c) and/or their signal-processing components based on a reference clock signal 326 received (e.g., directly received) from the shared clock source 340. For increased performance, e.g., to reduce or control jitter, in some applications, however, it is preferred that each receiver detector (318a, 318b, 318c) includes an integrated (i.e., on-board) PLL circuit that is configured to receive (e.g., directly receive) the reference clock signal 326 from the shared clock source 340.

In some implementations, the shared reference clock source 340 may include a reference clock 346 and a clock buffer 348 electronically coupled to the reference clock 346 that are each integrated onto the (e.g., common) PCB 343. Optionally, a communication port 349 (e.g., an Ethernet port) may also be disposed on the PCB 343. In some applications, the shared reference clock 346 is operatively coupled to clock buffer 348 and to the communication port 349. Advantageously, the shared reference clock 346 may be structured and arranged to drive (e.g., directly or indirectly) the electrical signal processing components of the receiver detectors (318a, 318b, 318c) that are disposed remotely to synchronize the firing of the emitters and the receipt of return light signals, providing thereby a greater degree of synchronization than has been provided using multiple sampling clocks.

As shown illustratively in FIG. 3, the shared reference clock 346 disposed on the second element 330 may drive and control the receiver detectors (318a, 318b, 318c) in a number of ways. The shared reference clock 346 may also be used as a reference clock across the external communication port 349 (e.g., an automotive Ethernet port). Since the shared reference clock 346 may be used in connection with an external communication port 349, the frequency of the shared reference clock 346 may be in multiples of 25 MHz.

In one implementation, the shared reference clock 346 may be used to drive and control the receiver detectors (318a, 318b, 318c) directly. For example, the shared reference clock 346 may be adapted to generate a clock reference signal 326 that travels to the receiver detectors (318a, 318b, 318c) via the clock buffer 348 (e.g., a 1 to N multiplexer) and a second clock buffer 319c. In one variation, the clock reference signal 326 may drive the PLL circuits with clock buffers 319c of the individual receiver detectors (318a, 318b, 318c) that are arranged in series (e.g., daisy-chained), such that the first receiver detector 318c receives the clock reference signal 326 and provides the clock reference signal 326 as input to a second receiver detector 318b, which provides the clock reference signal 326 as input to a third receiver detector 318a, and so forth. Advantageously, the receiver detectors (318a, 318b, 318c) and corresponding detector clocks may be daisy-chained to ease the clock routing. Thus, the clock reference signal 326 can synchronize the timing signals (e.g., sampling signals) for all components of the receiver detectors (318a, 318b, 318c).

In order to detect and reliably calculate TOF, it is often desirable, in the various implementations, to ensure that the clock link system is "clean" or free of jitter. Optionally, to control and/or reduce (e.g., minimize) jitter, a phase-locked loop (PLL) circuit may be added to the LiDAR system 310. Advantageously, the PLL circuit may be added to (e.g., incorporated into) the master controller 317, the shared clock 346, the receiver detectors, etc.

In a second variation, if the receiver detectors do not have input or output ports that would enable daisy-chaining, the master controller 317 may be used to drive the receiver detector clocks and the associated electrical signal processing components (e.g., ADCs) indirectly. For example, the master controller 317 may include PLLs 319a, 319b that can be used to generate and provide clock reference signals to the receiver detectors (318a, 318b, 318c).

Some Examples of Continuous Wave (CW) LiDAR Systems

As discussed above, some LiDAR systems may use a continuous wave (CW) laser to detect the range and/or velocity of targets, rather than pulsed TOF techniques. Such systems include frequency modulated continuous wave (FMCW) coherent LiDAR systems. For example, any of the LiDAR systems 100, 202, 250, and 270 described above can be configured to operate as an FMCW coherent LiDAR system.

Figure 4:
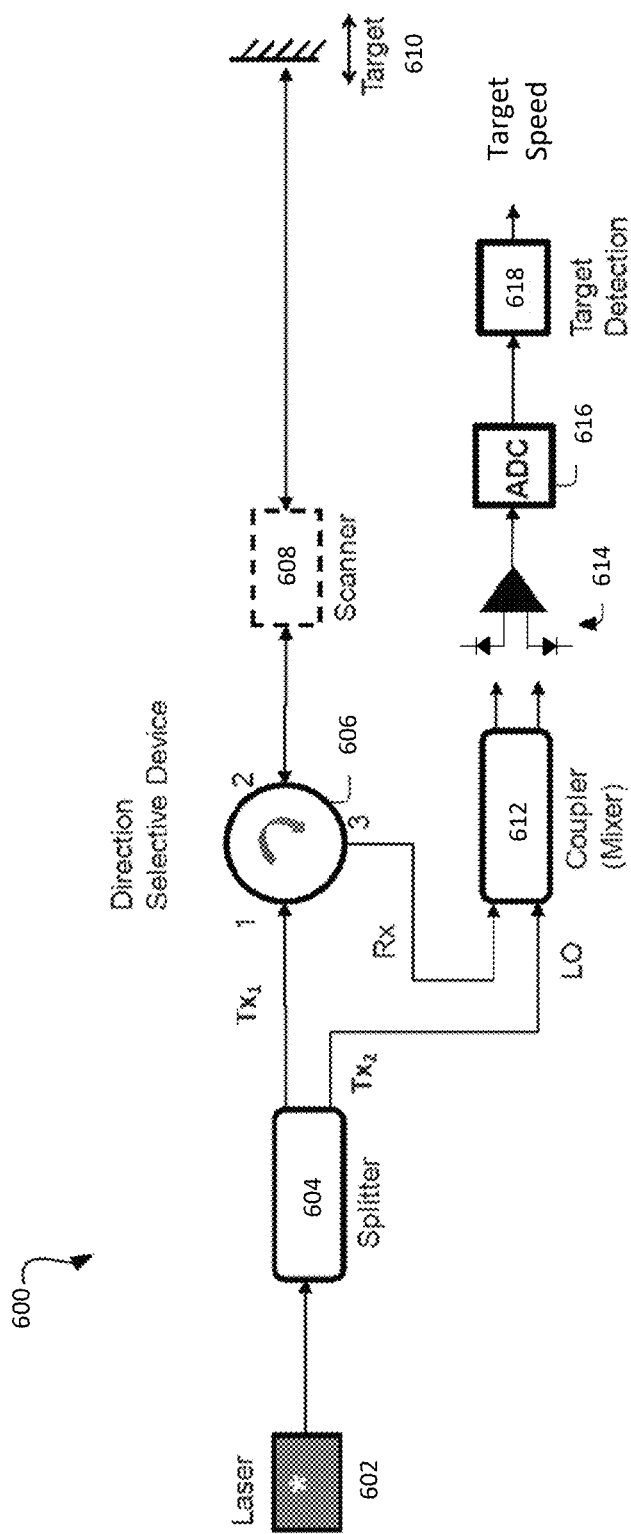
FIG. 4 is an illustration of an example frequency modulated continuous wave (FMCW) coherent LiDAR system.

FIG. 4 illustrates an exemplary FMCW coherent LiDAR system 600 configured to determine the radial velocity of a target. LiDAR system 600 includes a laser 602 configured to produce a laser signal which is provided to a splitter 604. The laser 602 may provide a laser signal having a substantially constant laser frequency.

In one example, a splitter 604 provides a first split laser signal Tx1 to a direction selective device 606, which provides (e.g., forwards) the signal Tx1 to a scanner 608. In some examples, the direction selective device 606 is a circulator. The scanner 608 uses the first laser signal Tx1 to transmit light emitted by the laser 602 and receives light reflected by the target 610 (e.g., "reflected light" or "reflections"). The reflected light signal Rx is provided (e.g., passed back) to the direction selective device 606. The second laser signal Tx2 and reflected light signal Rx are provided to a coupler (also referred to as a mixer) 612. The mixer may use the second laser signal Tx2 as a local oscillator (LO) signal and mix it with the reflected light signal Rx. The mixer 612 may be configured to mix the reflected light signal Rx with the local oscillator signal LO to generate a beat frequency $f_{beat}$ when detected by a differential photodetector 614. The beat frequency $f_{beat}$ from the differential photodetector 614 output is configured to produce a current based on the received light. The current may be converted to voltage by an amplifier (e.g., transimpedance amplifier (TIA)), which may be provided (e.g., fed) to an analog-to-digital converter (ADC) 616 configured to convert the analog voltage signal to digital samples for a target detection module 618. The target detection module 618 may be configured to determine (e.g., calculate) the radial velocity of the target 610 based on the digital sampled signal with beat frequency $f_{beat}$.

In one example, the target detection module 618 may identify Doppler frequency shifts using the beat frequency $f_{beat}$ and determine the radial velocity of the target 610 based on those shifts. For example, the velocity of the target 610 can be calculated using the following relationship:

$$f_d = \frac{2}{\lambda} v_t$$

where, $f_d$ is the Doppler frequency shift, $\lambda$ is the wavelength of the laser signal, and $v_t$ is the radial velocity of the target 610. In some examples, the direction of the target 610 is indicated by the sign of the Doppler frequency shift $f_d$. For example, a positive signed Doppler frequency shift may indicate that the target 610 is traveling towards the system 600 and a negative signed Doppler frequency shift may indicate that the target 610 is traveling away from the system 600.

In one example, a Fourier Transform calculation is performed using the digital samples from the ADC 616 to recover the desired frequency content (e.g., the Doppler frequency shift) from the digital sampled signal. For example, a controller (e.g., target detection module 618) may be configured to perform a Discrete Fourier Transform (DFT) on the digital samples. In certain examples, a Fast Fourier Transform (FFT) can be used to calculate the DFT on the digital samples. In some examples, the Fourier Transform calculation (e.g., DFT) can be performed iteratively on different groups of digital samples to generate a target point cloud.

While the LiDAR system 600 is described above as being configured to determine the radial velocity of a target, it should be appreciated that the system can be configured to determine the range and/or radial velocity of a target. For example, the LIDAR system 600 can be modified to use laser chirps to detect the velocity and/or range of a target.

Figure 5:
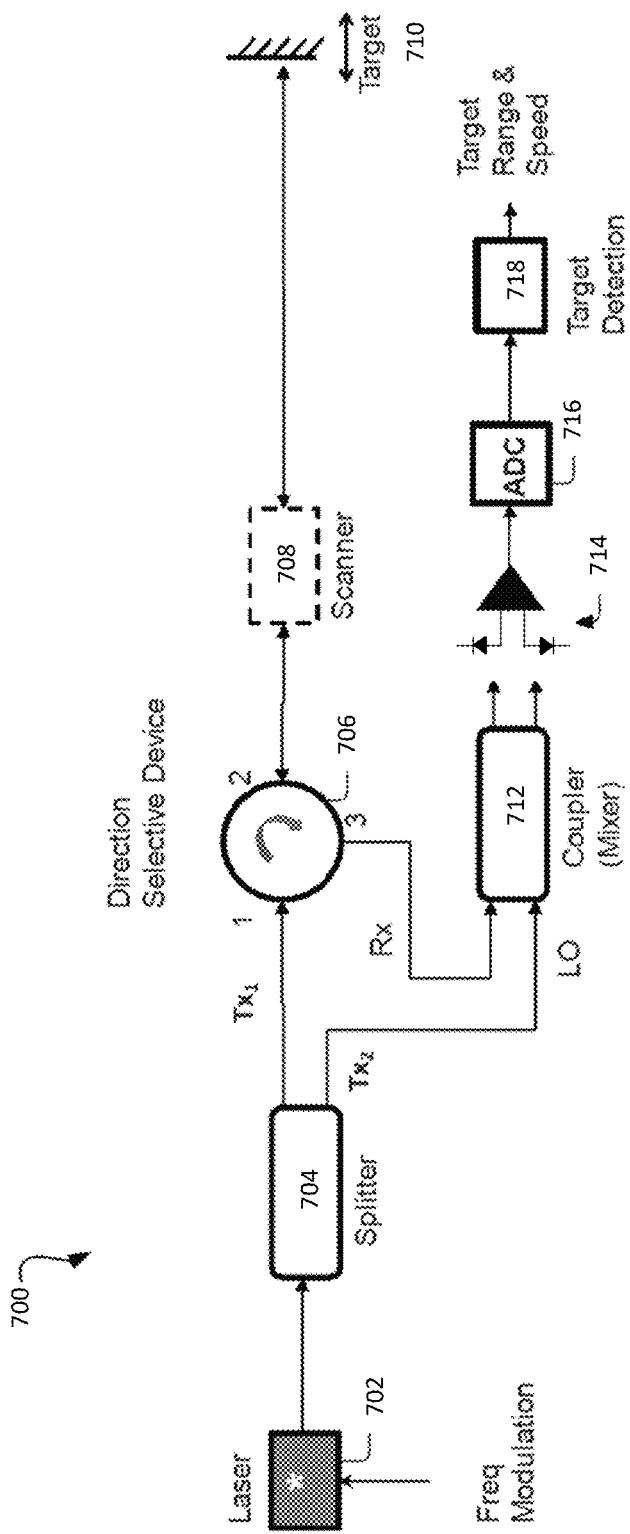
FIG. 5 is an illustration of another example FMCW coherent LiDAR system.

FIG. 5 illustrates an exemplary FMCW coherent LiDAR system 700 configured to determine the range and/or radial velocity of a target. LiDAR system 700 includes a laser 702 configured to produce a laser signal which is fed into a splitter 704. The laser is "chirped" (e.g., the center frequency of the emitted laser beam is increased ("ramped up" or "chirped up") or decreased ("ramped down" or "chirped down") over time (or, equivalently, the central wavelength of the emitted laser beam changes with time within a waveband). In various embodiments, the laser frequency is chirped quickly such that multiple phase angles are attained. In one example, the frequency of the laser signal is modulated by changing the laser operating parameters (e.g., current/voltage) or using a modulator included in the laser source 702; however, in other examples, an external modulator can be placed between the laser source 702 and the splitter 704.

In other examples, the laser frequency can be "chirped" by modulating the phase of the laser signal (or light) produced by the laser 702. In one example, the phase of the laser signal is modulated using an external modulator placed between the laser source 702 and the splitter 704; however, in some examples, the laser source 702 may be modulated directly by changing operating parameters (e.g., current/voltage) or include an internal modulator. Similar to frequency chirping, the phase of the laser signal can be increased ("ramped up") or decreased ("ramped down") over time.

Some examples of systems with FMCW-based LiDAR sensors have been described. However, the techniques described herein may be implemented using any suitable type of LiDAR sensors including, without limitation, any suitable type of coherent LiDAR sensors (e.g., phase-modulated coherent LiDAR sensors). With phase-modulated coherent LiDAR sensors, rather than chirping the frequency of the light produced by the laser (as described above with reference to FMCW techniques), the LiDAR system may use a phase modulator placed between the laser 702 and the splitter 704 to generate a discrete phase modulated signal, which may be used to measure range and radial velocity.

As shown, the splitter 704 provides a first split laser signal Tx1 to a direction selective device 706, which provides (e.g., forwards) the signal Tx1 to a scanner 708. The scanner 708 uses the first laser signal Tx1 to transmit light emitted by the laser 702 and receives light reflected by the target 710. The reflected light signal Rx is provided (e.g., passed back) to the direction selective device 706. The second laser signal Tx2 and reflected light signal Rx are provided to a coupler (also referred to as a mixer) 712. The mixer may use the second laser signal Tx2 as a local oscillator (LO) signal and mix it with the reflected light signal Rx. The mixer 712 may be configured to mix the reflected light signal Rx with the local oscillator signal LO to generate a beat frequency $f_{beat}$. The mixed signal with beat frequency $f_{beat}$ may be provided to a differential photodetector 714 configured to produce a current based on the received light. The current may be converted to voltage by an amplifier (e.g., a transimpedance amplifier (TIA)), which may be provided (e.g., fed) to an analog-to-digital converter (ADC) 716 configured to convert the analog voltage to digital samples for a target detection module 718. The target detection module 718 may be configured to determine (e.g., calculate) the range and/or radial velocity of the target 710 based on the digital sampled signal with beat frequency $f_{beat}$.

Laser chirping may be beneficial for range (distance) measurements of the target. In comparison, Doppler frequency measurements are generally used to measure target velocity. Resolution of distance can depend on the bandwidth size of the chirp frequency band such that greater bandwidth corresponds to finer resolution, according to the following relationships:

Range resolution: $\Delta R = \dfrac{c}{2BW}$ (given a perfectly linear chirp), and Range: $R = \dfrac{f_{beat} c \ T_{ChirpRamp}}{2 \ BW}$ where c is the speed of light, BW is the bandwidth of the chirped laser signal, $f_{beat}$ is the beat frequency, and $T_{ChirpRamp}$ is the time period during which the frequency of the chirped laser ramps up (e.g., the time period corresponding to the up-ramp portion of the chirped laser). For example, for a distance resolution of 3.0 cm, a frequency bandwidth of 5.0 GHz may be used. A linear chirp can be an effective way to measure range and range accuracy can depend on the chirp linearity. In some instances, when chirping is used to measure target range, there may be range and velocity ambiguity. In particular, the reflected signal for measuring velocity (e.g., via Doppler) may affect the measurement of range. Therefore, some exemplary FMCW coherent LiDAR systems may rely on two measurements having different slopes (e.g., negative and positive slopes) to remove this ambiguity. The two measurements having different slopes may also be used to determine range and velocity measurements simultaneously.

Figures 6A, 6B:
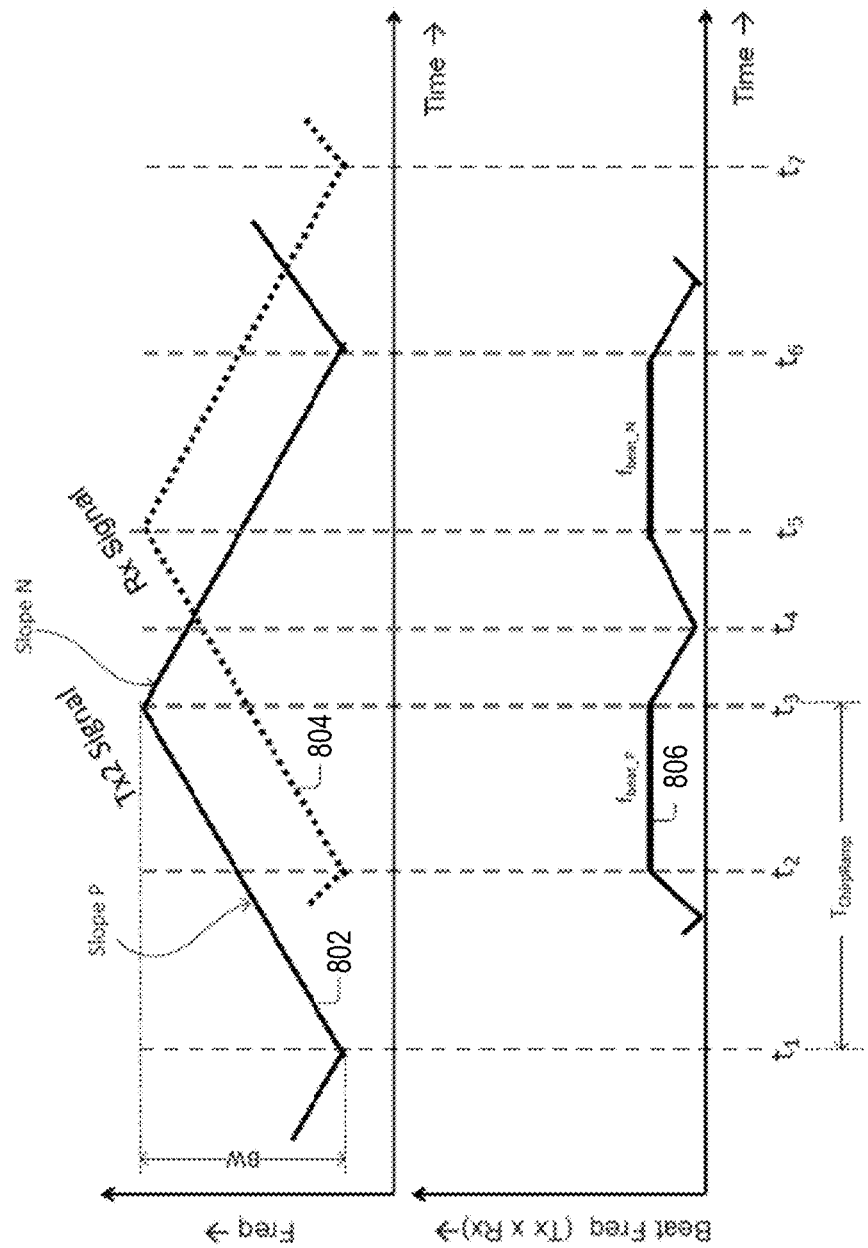
FIG. 6A is a plot of a frequency chirp as a function of time in a transmitted laser signal and reflected signal, according to an example.
FIG. 6B is a plot illustrating an example of a beat frequency of a mixed signal.

FIG. 6A is a plot of ideal (or desired) frequency chirp as a function of time in the transmitted laser signal Tx (e.g., signal Tx2), depicted in solid line 802, and reflected light signal Rx, depicted in dotted line 804. As depicted, the ideal Tx signal has a positive linear slope between time t1 and time t3 and a negative linear slope between time t3 and time t6. Accordingly, the ideal reflected light signal Rx returned with a time delay td of approximately t2-t1 has a positive linear slope between time t2 and time t5 and a negative linear slope between time t5 and time t7.

FIG. 6B is a plot illustrating the corresponding ideal beat frequency $f_{beat}$ 806 of the mixed signal Tx2×Rx. Note that the beat frequency $f_{beat}$ 806 has a constant value between time t2 and time t3 (corresponding to the overlapping up-slopes of signals Tx2 and Rx) and between time t5 and time t6 (corresponding to the overlapping down-slopes of signals Tx2 and Rx).

The positive slope ("Slope P") and the negative slope ("Slope N") (also referred to as positive ramp (or up-ramp) and negative ramp (or down-ramp), respectively) can be used to determine range and/or velocity. In some instances, referring to FIGS. 8A-8B, when the positive and negative ramp pair is used to measure range and velocity simultaneously, the following relationships are utilized:

Range: $R = \dfrac{cT_{ChirpRamp} \dfrac{(f_{beat,P} + f_{beat,N})}{2}}{2BW}$, and Velocity: $V = \dfrac{\lambda \dfrac{(f_{beat,P} - f_{beat,N})}{2}}{2}$ where $f_{beat\_P}$ and $f_{beat\_N}$ are beat frequencies generated during positive (P) and negative (N) slopes of the chirp 802 respectively and A is the wavelength of the laser signal.

In one example, the scanner 708 of the LiDAR system 700 is used to scan the environment and generate a target point cloud from the acquired scan data. In some examples, the LiDAR system 700 can use processing methods that include performing one or more Fourier Transform calculations, such as a Fast Fourier Transform (FFT) or a Discrete Fourier Transform (DFT), to generate the target point cloud from the acquired scan data. Being that the system 700 is capable of measuring range, each point in the point cloud may have a three-dimensional location (e.g., x, y, and z) in addition to radial velocity. In some examples, the x-y location of each target point corresponds to a radial position of the target point relative to the scanner 708. Likewise, the z location of each target point corresponds to the distance between the target point and the scanner 708 (e.g., the range). In one example, each target point corresponds to one frequency chirp 802 in the laser signal. For example, the samples collected by the system 700 during the chirp 802 (e.g., t1 to t6) can be processed to generate one point in the point cloud.

Some Examples of Computing Devices and Information Handling Systems

In embodiments, aspects of the techniques described herein (e.g., timing the emission of the transmitted signal, processing received return signals, and so forth) may be directed to or implemented on information handling systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be a personal computer (e.g., laptop), tablet computer, phablet, personal digital assistant (PDA), smart phone, smart watch, smart package, server (e.g., blade server or rack server), a network storage device, or any other suitable device and may vary in size, shape, performance, functionality, and price.

Figure 7:
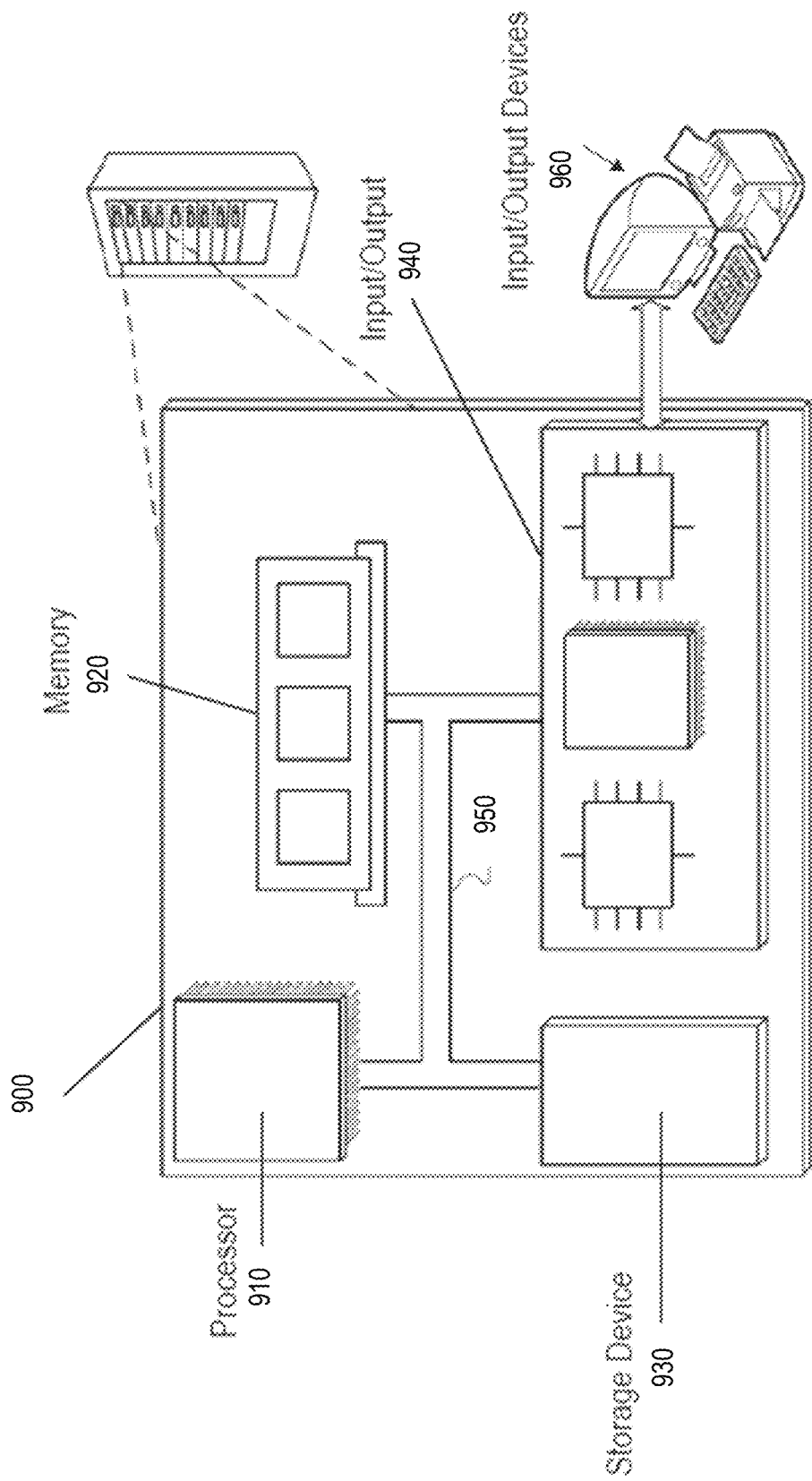
FIG. 7 shows a block diagram of a computing device/information handling system, in accordance with some embodiments.

FIG. 7 is a block diagram of an example computer system 900 that may be used in implementing the technology described in this document. General-purpose computers, network appliances, mobile devices, or other electronic systems may also include at least portions of the system 900. The system 900 includes a processor 910, a memory 920, a storage device 930, and an input/output device 940. Each of the components 910, 920, 930, and 940 may be interconnected, for example, using a system bus 950. The processor 910 is capable of processing instructions for execution within the system 900. In some implementations, the processor 910 is a single-threaded processor. In some implementations, the processor 910 is a multi-threaded processor. The processor 910 is capable of processing instructions stored in the memory 920 or on the storage device 930.

The memory 920 stores information within the system 900. In some implementations, the memory 920 is a non-transitory computer-readable medium. In some implementations, the memory 920 is a volatile memory unit. In some implementations, the memory 920 is a non-volatile memory unit.

The storage device 930 is capable of providing mass storage for the system 900. In some implementations, the storage device 930 is a non-transitory computer-readable medium. In various different implementations, the storage device 930 may include, for example, a hard disk device, an optical disk device, a solid-date drive, a flash drive, or some other large capacity storage device. For example, the storage device may store long-term data (e.g., database data, file system data, etc.). The input/output device 940 provides input/output operations for the system 900. In some implementations, the input/output device 940 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 960. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 930 may be implemented in a distributed way over a network, for example as a server farm or a set of widely distributed servers, or may be implemented in a single computing device.

Although an example processing system has been described in FIG. 7, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Figure 8:
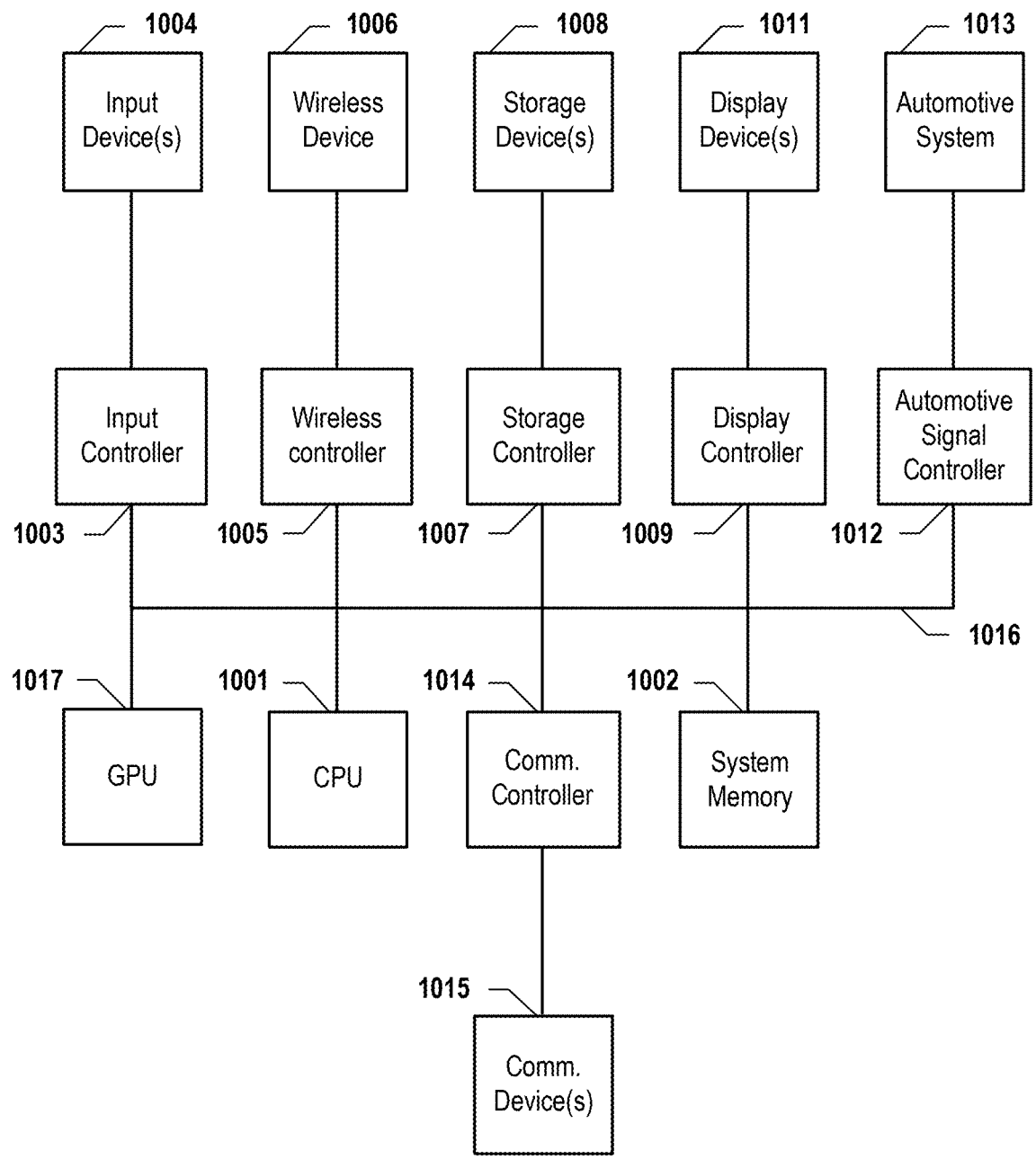
FIG. 8 is a block diagram of an example computer system.

FIG. 8 depicts a simplified block diagram of a computing device/information handling system (or computing system) according to embodiments of the present disclosure. It will be understood that the functionalities shown for system 1000 may operate to support various embodiments of an information handling system—although it shall be understood that an information handling system may be differently configured and include different components.

As illustrated in FIG. 8, system 1000 includes one or more central processing units (CPU) 1001 that provide(s) computing resources and control(s) the computer. CPU 1001 may be implemented with a microprocessor or the like, and may also include one or more graphics processing units (GPU) 1017 and/or a floating point coprocessor for mathematical computations. System 1000 may also include a system memory 1002, which may be in the form of random-access memory (RAM), read-only memory (ROM), or both.

A number of controllers and peripheral devices may also be provided. For example, an input controller 1003 represents an interface to various input device(s) 1004, such as a keyboard, mouse, or stylus. There may also be a scanner controller 1005, which communicates with a scanner 1006. System 1000 may also include a storage controller 1007 for interfacing with one or more storage devices 1008 each of which includes a storage medium such as magnetic tape or disk, or an optical medium that might be used to record programs of instructions for operating systems, utilities, and applications, which may include embodiments of programs that implement various aspects of the techniques described herein. Storage device(s) 1008 may also be used to store processed data or data to be processed in accordance with some embodiments. System 1000 may also include a display controller 1009 for providing an interface to a display device 1011, which may be a cathode ray tube (CRT), a thin film transistor (TFT) display, or other type of display. The computing system 1000 may also include an automotive signal controller 1012 for communicating with an automotive system 1013. A communications controller 1014 may interface with one or more communication devices 1015, which enables system 1000 to connect to remote devices through any of a variety of networks including the Internet, a cloud resource (e.g., an Ethernet cloud, an Fiber Channel over Ethernet (FCOE)/Data Center Bridging (DCB) cloud, etc.), a local area network (LAN), a wide area network (WAN), a storage area network (SAN), or through any suitable electromagnetic carrier signals including infrared signals.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of some embodiments may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Some embodiments may be encoded upon one or more non-transitory, computer-readable media with instructions for one or more processors or processing units to cause steps to be performed. It shall be noted that the one or more non-transitory, computer-readable media shall include volatile and non-volatile memory. It shall also be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that some embodiments may further relate to computer products with a non-transitory, tangible computer-readable medium that has computer code thereon for performing various computer-implemented operations. The medium and computer code may be those specially designed and constructed for the purposes of the techniques described herein, or they may be of the kind known or available to those having skill in the relevant arts. Examples of tangible, computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that is executed by a computer using an interpreter. Some embodiments may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the techniques described herein. One skilled in the art will also recognize that a number of the elements described above may be physically and/or functionally separated into sub-modules or combined together.

Terminology

The phrasing and terminology used herein is for the purpose of description and should not be regarded as limiting.

Measurements, sizes, amounts, and the like may be presented herein in a range format. The description in range format is provided merely for convenience and brevity and should not be construed as an inflexible limitation on the scope of the invention. Accordingly, the description of a range should be considered to have specifically disclosed all the possible subranges as well as individual numerical values within that range. For example, description of a range such as 1-20 meters should be considered to have specifically disclosed subranges such as 1 meter, 2 meters, 1-2 meters, less than 2 meters, 10-11 meters, 10-12 meters, 10-13 meters, 10-14 meters, 11-12 meters, 11-13 meters, etc.

Furthermore, connections between components or systems within the figures are not intended to be limited to direct connections. Rather, data or signals between these components may be modified, re-formatted, or otherwise changed by intermediary components. Also, additional or fewer connections may be used. The terms "coupled," "connected," or "communicatively coupled" shall be understood to include direct connections, indirect connections through one or more intermediary devices, wireless connections, and so forth.

Reference in the specification to "one embodiment," "preferred embodiment," "an embodiment," "some embodiments," or "embodiments" means that a particular feature, structure, characteristic, or function described in connection with the embodiment is included in at least one embodiment of the invention and may be in more than one embodiment. Also, the appearance of the above-noted phrases in various places in the specification is not necessarily referring to the same embodiment or embodiments.

The use of certain terms in various places in the specification is for illustration purposes only and should not be construed as limiting. A service, function, or resource is not limited to a single service, function, or resource; usage of these terms may refer to a grouping of related services, functions, or resources, which may be distributed or aggregated.

Furthermore, one skilled in the art shall recognize that: (1) certain steps may optionally be performed; (2) steps may not be limited to the specific order set forth herein; (3) certain steps may be performed in different orders; and (4) certain steps may be performed simultaneously or concurrently.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements).

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements).

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A light detection and ranging (LIDAR) system comprising:
   a transceiver disposed on a first substrate and comprising a plurality of receiver detectors; and
   a shared clock source disposed remotely from the transceiver on a second substrate and comprising a shared clock that is structured and arranged to control and synchronize operation of the plurality of receiver detectors to determine time-of-flight or reflectance.

2. The LIDAR system of claim 1, wherein each receiver detector in the plurality of receiver detectors includes an analog-to-digital converter (ADC), a time-to-digital converter (TDC), an application-specific integrated circuit (ASIC), and/or an FPGA.

3. The LIDAR system of claim 1, wherein each receiver detector in the plurality of receiver detectors includes an integrated analog-to-digital converter (ADC).

4. The LIDAR system of claim 3, wherein the plurality of receiver detectors are structured and arranged in a daisy-chain arrangement, such that an output from a first receiver detector in the plurality of receiver detectors is electronically coupled to an input of a second receiver detector in the plurality of receiver detectors.

5. The LIDAR system of claim 3, wherein the shared clock source further comprises at least one clock buffer that is operatively coupled to at least one receiver detector.

6. The LIDAR system of claim 3, wherein each ADC further comprises a phase-locked loop (PLL) circuit that is structured and arranged to generate a sampling clock for the respective ADC.

7. The LIDAR system of claim 3 further comprising at least one clock buffer disposed on the first substrate, wherein the at least one clock buffer is operatively coupled to at least one receiver detector and the shared clock source.

8. The LIDAR system of claim 3 further comprising a processing device disposed on the first substrate, wherein the processing device is operatively coupled to the plurality of receiver detectors and the shared clock source.

9. The LIDAR system of claim 8, wherein the processing device comprises a field programmable gate array (FPGA), a central processing unit (CPU), and/or a graphics processing unit (GPU).

10. The LIDAR system of claim 1, wherein the shared clock source further comprises at least one clock buffer disposed on the second substrate that is operatively coupled to at least one clock buffer disposed on the first substrate.

11. The LIDAR system of claim 1 further comprising:
at least one signal receiver structured and arranged on the first substrate; and
at least one signal driver structured and arranged on the second substrate.

12. The LIDAR system of claim 11, wherein each of the signal drivers is adapted to propagate a signal to a corresponding one of the signal receivers across a rotational boundary between the first substrate and the second substrate.

13. The LIDAR system of claim 1, wherein the first substrate is housed in a rotating element and the second substrate is housed in a stationary element.

14. The LIDAR system of claim 1, wherein the transceiver comprises a frequency-modulated continuous-wave LIDAR transceiver.

* * * * *